(12) United States Patent
Kinnunen

(10) Patent No.: US 7,065,346 B2
(45) Date of Patent: Jun. 20, 2006

(54) MANAGING THE CONFIGURATION OF A SHARED NETWORK NODE

(75) Inventor: Tero-Matti Kinnunen, Tampere (FI)

(73) Assignee: Nokia Corporation, Espoo (FI)

(*) Notice: Subject to any disclaimer, the term of this patent is extended or adjusted under 35 U.S.C. 154(b) by 321 days.

(21) Appl. No.: 10/372,238

(22) Filed: Feb. 25, 2003

(65) Prior Publication Data

US 2003/0181207 A1    Sep. 25, 2003

(51) Int. Cl.
*H04M 3/00* (2006.01)

(52) U.S. Cl. .............. 455/418; 455/410; 455/411; 455/419; 455/420; 455/423; 455/67.11; 707/9; 709/223

(58) Field of Classification Search ............. 455/414.1, 455/432.3, 418, 419, 420, 423, 403; 707/1, 707/4, 9, 10; 709/223
See application file for complete search history.

(56) References Cited

U.S. PATENT DOCUMENTS

| | | | | |
|---|---|---|---|---|
| 5,787,428 A | * | 7/1998 | Hart | 707/9 |
| 5,941,947 A | * | 8/1999 | Brown et al. | 709/225 |
| 6,275,825 B1 | * | 8/2001 | Kobayashi et al. | 707/9 |
| 6,487,552 B1 | * | 11/2002 | Lei et al. | 707/4 |
| 6,606,627 B1 | * | 8/2003 | Guthrie et al. | 707/10 |
| 6,763,344 B1 | * | 7/2004 | Osentoski et al. | 707/1 |
| 2002/0087479 A1 | * | 7/2002 | Malcolm | 705/64 |
| 2003/0061509 A1 | * | 3/2003 | Fisher | 713/201 |

* cited by examiner

*Primary Examiner*—Steve M. D'Agosta
(74) *Attorney, Agent, or Firm*—Squire, Sanders & Dempsey LLP

(57) ABSTRACT

Management of network node configurations is designed under the assumption that there is only one operator. However, in future, several operators will be able to share the same network node. In this case, it is not desirable that the configuration of a network node is visible to and editable by all operators sharing the network node. The method, system and network node of the invention, wherein the network node configuration (K) comprises at least one common configuration part (Com) and at least one operator-specific configuration part (OC1, OC2, OC3) whose management right is restricted to only some of the operators sharing the network node, provide the network node with properties that all operators cannot edit.

22 Claims, 2 Drawing Sheets ial parts. For example, if operators A and B share a network node, the network node comprises as configuration data at least a common part, the configuration part of operator A and the configuration part of operator B. This means that, for operator A, the configuration of the network node is composed of the common part and the configuration part of operator A. Similarly, for operator B, the configuration of the network node is composed of the common part and the configuration part of operator B. Operator B is unable to edit the configuration part of operator A and, similarly, operator A is unable to edit the configuration part of operator B, but both operators are able to edit the common part.

MANAGING THE CONFIGURATION OF A SHARED NETWORK NODE

FIELD OF THE INVENTION

The invention relates to telecommunication networks, where several competing operators are able to share network resources by sharing a network node or network nodes. Sharing implies that a network node is managed by several operators. The invention relates particularly to a radio network in what is called a third generation mobile network, the radio network being typically shared by sharing the radio network controller.

BACKGROUND OF THE INVENTION

Telecommunication systems, particularly mobile systems, are developing at an increasing pace. For example, a move over from second-generation mobile systems is taking place very fast, to what are called third-generation mobile systems, such as the UMTS (Universal Mobile Telecommunications System).

Building a network based on a new system is very expensive, although the network of the previous generation could be utilized in the network. The building becomes particularly expensive for operators who do not have a second-generation network. A suggestion has been made to lower the costs of setting up and maintaining a network by a consortium of two or more network operators sharing the physical transfer means, such as radio network controllers and base stations, and yet being able to compete with each other.

The problem in sharing is that the management of the configuration of physical transfer means, such as a radio network controller, has been designed under the assumption that there is only one operator. As a result, the configuration of, for example, a radio network controller is visible to and editable by all operators sharing the radio network controller. A solution to the problem is for the operators to agree among each other upon the configuration data that can be edited without asking the other operators' opinion. The problem in this solution is that it in no way prevents the configuration from being edited unintentionally or intentionally in a physical network element contrary to the agreement. Furthermore, a common configuration means that the operators have to use the same kind of properties and are therefore unable to compete by the differences provided by these properties.

BRIEF DESCRIPTION OF THE INVENTION

The object of the invention is thus to provide a method and an apparatus for implementing the method to solve the above problems. The object of the invention is achieved by a method, a system and a network node that are characterized by what is stated in the independent claims. The preferred embodiments of the invention are disclosed in the dependent claims.

The invention is based on dividing the configuration of a network node at least into a common configuration part common to all operators and into operator-specific configuration parts. For example, if operators A and B share a network node, the network node comprises as configuration data at least a common part, the configuration part of operator A and the configuration part of operator B. This means that, for operator A, the configuration of the network node is composed of the common part and the configuration part of operator A. Similarly, for operator B, the configuration of the network node is composed of the common part and the configuration part of operator B. Operator B is unable to edit the configuration part of operator A and, similarly, operator A is unable to edit the configuration part of operator B, but both operators are able to edit the common part.

The advantage of the invention is that each operator is able to configure properties of a network node that others are unable to edit. In addition, these operator-specific configuration parts allow the operators to also compete by the properties of the radio network, since the operator-specific configuration parts enable the customisation of the shared radio network.

In a preferred embodiment of the invention, only the part of a specific operator is filtered from the operator-specific configurations for display to the user carrying out the management in addition to the common part. A further advantage of this embodiment is that competing operators are unable to access the configuration of their competitor.

BRIEF DESCRIPTION OF THE FIGURES

In the following, the invention will be described in detail in connection with preferred embodiments with reference to the accompanying drawings, in which.

DETAILED DESCRIPTION OF THE INVENTION

The present invention is applicable in any telecommunication system where several operators are able to share a physical transfer means. Such systems include for instance what are called third generation mobile systems, such as the UMTS and IS-41, and mobile systems corresponding to the GSM system, such as GSM 1800 and PCS (Personal Communication System), and systems based on said systems, such as GSM 2+ systems and future mobile systems, such as fourth generation mobile systems. A mobile system generally refers to any telecommunication system enabling wireless communication as users move within the service area of the system. The invention is also applicable in what are called fixed systems, where at least two separate operators are able to operate. In the following, the invention is described using the UMTS system and a radio network controller in its radio access network as an example, without restricting the invention thereto. The specifications of mobile systems and, particularly, third generation mobile systems, change rapidly. Such development may require extra changes in the invention. All words and expressions should therefore be interpreted broadly and they are intended to illustrate, not restrict, the invention. What is essential to the invention is the function, not the network node where the function is located.

Figure 1:
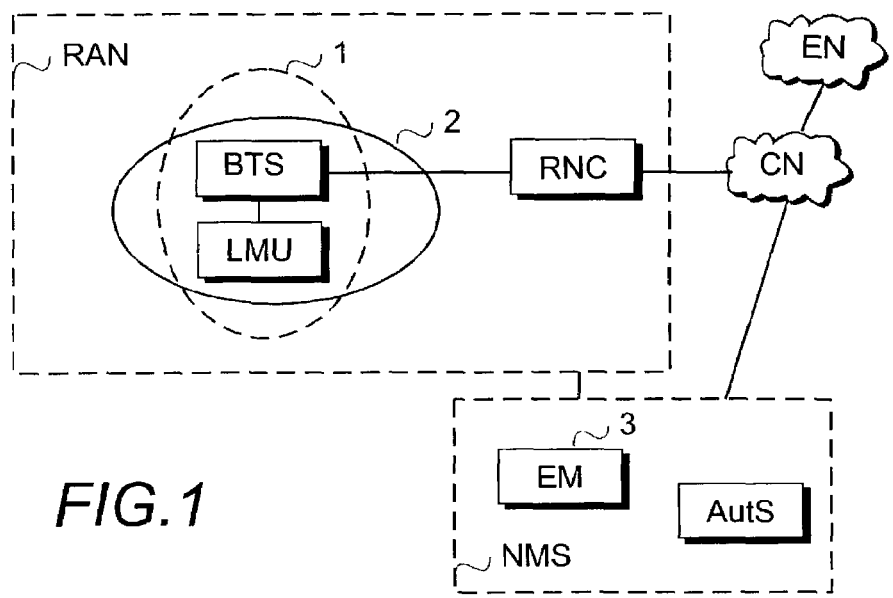
FIG. 1 shows UMTS network nodes that are essential to a first preferred embodiment of the invention.

FIG. 1 shows a simplified network architecture illustrating only some network nodes of a given system architecture. The implementation of the network nodes shown in FIG. 1 is only an example of implementing network nodes. It is apparent to a person skilled in the art that the system may also comprise other functions and structures that need not be described in detail herein.

The main parts of the UMTS system are a core network (CN), via which a connection exists to external networks EN, a UMTS terrestrial radio network and a Network Management System (NMS). The assumption in a first embodiment of the invention is that each operator has a separate core network and network management system, the terrestrial radio network being shared.

A terrestrial radio network is composed of a number of radio access networks (RAN), coupled to the core network CN. The radio access network RAN is a network part that uses the WCDMA (Wideband Code Division Multiple Access) technique in dividing resources of the radio path and it can be called a radio network subsystem. Each RAN is responsible for the resources of its cells. The radio access network comprises a radio network controller RNC and one or more base transceiver stations BS including an ATM (Asynchronous Transfer Mode) router and auxiliary BTS site device(s), such as site support equipment and a Location Management Unit LMU, for example.

The radio network controller RNC is a network node responsible for controlling the radio resources of the RAN. It connects to the core network CN and decides upon an RRC protocol (Radio Resource Control) that defines the messages and procedures between a mobile station and the RAN. Logically, it corresponds to a base station controller in the GSM system. In other words, the RNC is responsible for controlling the radio resources of the RAN and the load status of the cells belonging to the RNC. The configuration of a radio network controller RNC according to a first preferred embodiment of the invention is presented in detail in FIG. 2. In the first preferred embodiment of the invention, the configuration comprises objects that have a type and index and possibly different parameter values. In the first preferred embodiment of the invention, the radio network controller RNC also comprises user profiles for determining user rights. User profiles are described in detail in connection with an authentication server and FIG. 3.

The base stations BS are also called Nodes B. The main task of a base station is to attend to the air interface in the direction of a mobile station (not shown in FIG. 1) and the processing in the physical layer, associated with the air interface, such as channel coding and interleaving, rate adjustment, spreading etc. It also performs some basic radio resource management operations, such as internal circuit power control. Logically, it corresponds to a base station in the GSM system.

The network management subsystem NMS has an interface to other network parts. The network management subsystem NMS comprises an operator management apparatus 3, such as a workstation, which comprises network node management software EM (Element Manager). The EM comprises a user interface for supplying and/or receiving inputs to/from the user of the management apparatus. The user interface may be a graphic user interface or a command line-based interface, also called MMI (Man Machine Interface). The EM can be used to set up a remote connection preferably to any network node.

The NMS also comprises an authentication server AutS, which in the first preferred embodiment of the invention is a centralized server. The authentication server is used to find out the user rights of the user of the management software EM, preferably network node-specifically. This may be carried out for example by attaching information on the user's user profile or profiles to the user's information. The actual rights are then defined in the user profile, which may include any information relating to the user's rights. The user profile specifications are preferably located in the network node whose configuration is concerned. The user rights may also be specified in the information on the user of the authentication server, whereby no actual user profiles are needed.

In the example of FIG. 1, cells 1 and 2 illustrate both different operators and the fact that, in the shared radio network of the invention, one base station is used to provide each operator with a separate cell by means of the different configurations at the RNC. In other words, cells 1 and 2 illustrate the fact that the physical device is common, and only radio frequency, i.e. cells are shared.

Figure 2:
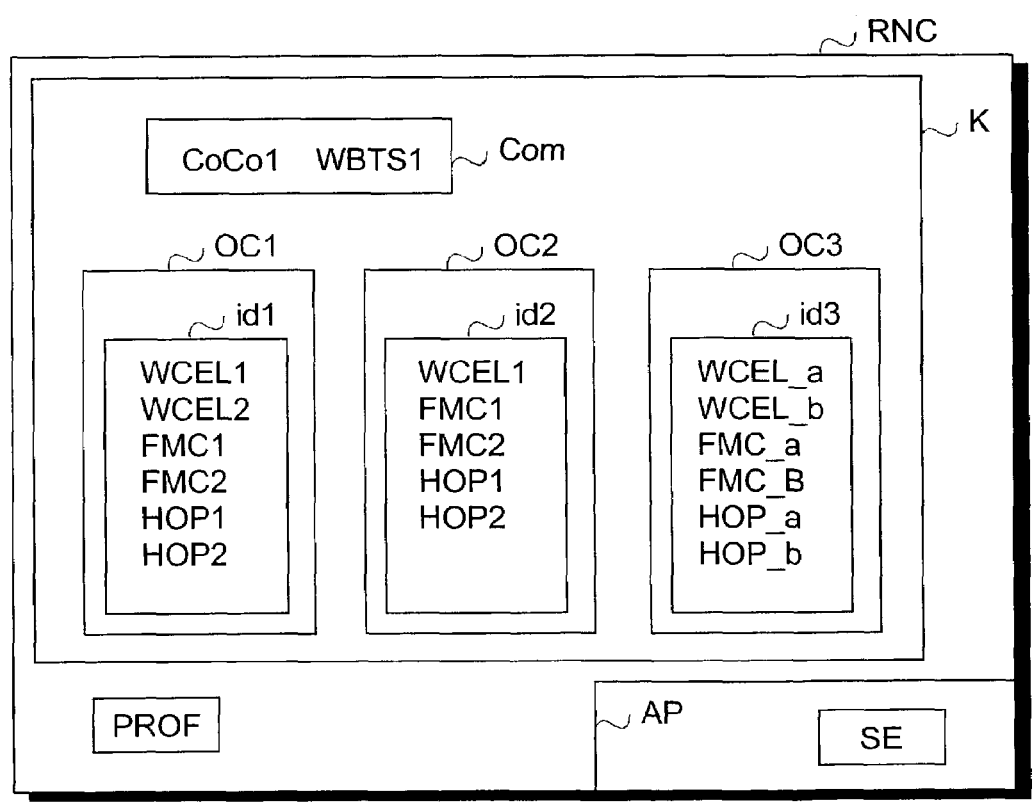
FIG. 2 shows an example of a configuration according to the first preferred embodiment of the invention.

FIG. 2 generally illustrates a radio network controller of the first preferred embodiment of the invention, and, more particularly, the configuration K of the radio network controller, the configuration being used to control one base station and base station controller as regards said base station. In other words, in the first preferred embodiment of the invention, a specific configuration is specified for each base station in the radio network controller. The configuration parts shown in FIG. 2 control the radio devices at a base station. The example of FIG. 2 assumes that three competing operators share a radio network controller. Let it be pointed out that FIG. 2 only shows an example of objects, object types and their division into configuration parts, and the invention is in no way restricted thereto.

Configuration K comprises a common part Com, which is thus the same for all operators sharing the radio network controller. The common part Com comprises objects concerning for instance the physical transmission path or other objects that have to be the same for every operator in order for e.g. the radio network controller and the base station to operate. The common part comprises two objects, one of which is of type CoCo (Connection Configuration) and has an index CoCo1. The CoCo object associates the base station radio device management configuration with the physical transport configuration. In other words, the CoCo associates the cells with the links in the ATM layer associated with their management. The other object in the common part is of type WBTS (WCDMA Base Transceiver Station) and its index is WBTS1. The WBTS object is a base station object. These two objects are visible to every operator, and each operator is able to edit them and any associated parameters within the scope of the user rights.

The assumption in a first embodiment of the invention is that the configuration part to which no operator identifier is attached is common and thus the objects are editable by everyone. In the operator-specific configuration part, each object is attached to an operator identifier id1, id2, id3. The operator identifier is a parameter by means of which the operator-specific configuration part can be linked with a given operator. The operator identifier may be network node-specific, and it will suffice that it is network node-specifically unique.

The objects in operator-specific configuration parts OC1, OC2 and OC3 each constitute an entity, which may be called a logical RNC. The objects in operator-specific configuration parts typically relate to either cells (i.e. the radio path from a base station) or an RNC. For the object types and parameters related thereto, each operator is able to define specific objects and values within the scope of the user rights, and they only relate to the operator's cell and/or only the RNC property visible to the operator. The operator-specific configuration part in the example of FIG. 2 comprises objects of type WCEL (WCDMA Cell), FMC (Frequency Measurement Control) and HOP (Hand Over Path), all of which are associated with a cell. The WCEL object is an object of a radio cell and a sub-object of the common object WBTS 1, the FMC object is associated with base station management and the HOP object to mobility management, and both of them are sub-objects to the logical RNC. Let it be pointed out that the object types described above are only examples, and the objects and their types and sub-objects in an operator-specific configuration may be different for different operators.

In the example of FIG. 2, the operator-specific configuration of an operator having the operator identifier id1 comprises objects of the above type, whose indexes are WCEL1, WCEL2, FMC1, FMC2, HOP1 and HOP2. Similarly, the operator-specific configuration of an operator having the operator identifier id2 comprises objects whose indexes are WCEL1, FMC1, FMC2, HOP1 and HOP2. In these different operator-specific configurations, the indexes may be the same because each operator only sees its own operator-specific configuration and the same index does therefore not cause confusion. In addition, in the first preferred embodiment of the invention, none of the operators is aware of the operator-specific configurations of the other operators, nor the indexes used therein, and so the indexing of the objects is preferably free. In other words, all indexes are preferably used by all operators. The operator-specific configuration of a third operator comprises objects whose indexes are WCEL_a, WCEL_b, FMC_a, FMC_b, HOP_a and HOP_b.

The configurations shown in FIG. 2 are preferably specified at the radio network controller separately for each base station operating under the radio network controller. It is also feasible that a base station-specific configuration is specified at the radio network controller for some base stations, while the rest use a common configuration specified for them or, alternatively, the same configuration is used for all base stations.

The radio network controller RNC of the first preferred embodiment of the invention also comprises user profile specifications PROF, which are described in detail in connection with the authentication server of FIG. 1 and FIG. 3, and an application part AP comprising means, such as a filter element SE, for receiving, transmitting and processing information, and whose operation will be described in detail in connection with FIG. 3.

Figure 3:
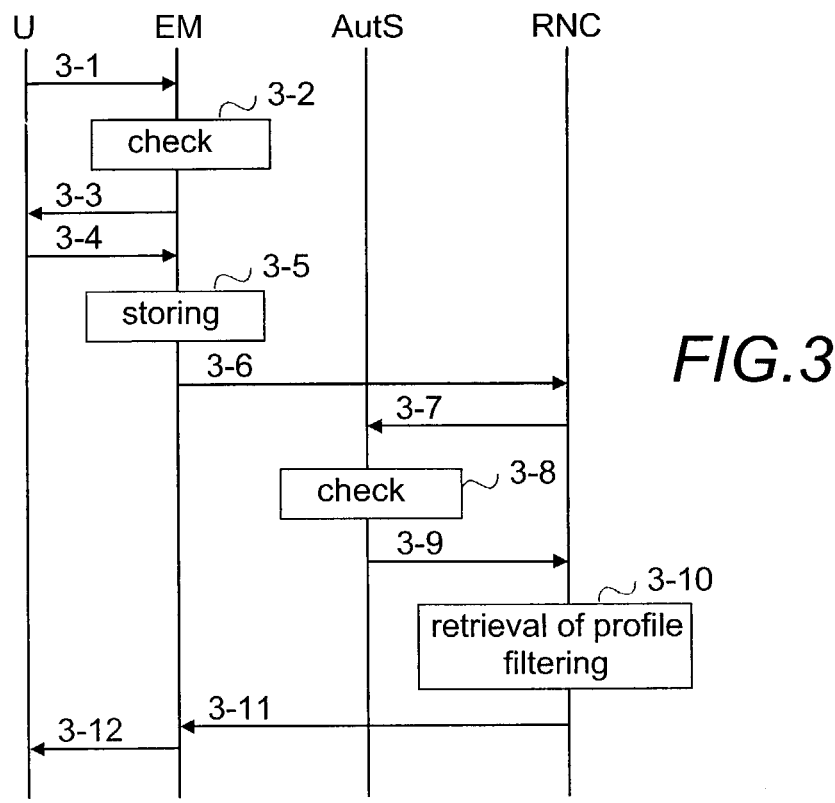
FIG. 3 shows data transfer according to the first preferred embodiment of the invention.

FIG. 3 shows data transfer associated with a network management operation in the first preferred embodiment of the invention. For the sake of clarity, the example of FIG. 3 assumes that there is only one base station under the radio network controller and, consequently, one configuration. It is apparent to a person skilled in the art that there are typically several base stations under a radio network controller, and the configuration regarding one base station is selected e.g. according to the prior art. The first preferred embodiment of the invention assumes that user profiles are specified operator-specifically at each radio network controller such that at least one user profile is specified for each operator sharing the radio network controller. Each user profile has an at least radio network controller-specifically unique identifier. The first preferred embodiment of the invention also assumes that the user only has one operator identifier included in the user profile specified at the radio network controller. An operator may have users at different levels, whose user rights, i.e. the right to edit the configuration may be different. The user rights can be specified for example by specifying the object types with which the user is allowed to operate within the scope of that particular operator identifier. The first preferred embodiment of the invention also assumes that the user is able to edit or study the configurations of several different network nodes during a session between the user and the management software.

The starting point in FIG. 3 is that user U transmits, to the management software EM, information 3-1 indicating that the user is interested in the configuration of the radio network controller RNC. The information may include e.g. an edit request, a request to see the configuration or a request for an opening a session to said network node.

In step 3-2, the management software EM checks to see if the user has an active session with the management software. The example of FIG. 3 assumes that this is not the case. The management software therefore requests, in information 3-3, a user identifier and a password from user U, which user U returns in information 3-4. In step 3-5, the management software stores the user identifier and the password in its memory for the duration of the session, and transmits, in information 3-6, the user identifier and the password to the network node RNC. If there had been a session (step 3-2), the management software would have retrieved the user identifier and the password from its memory and transmitted them to the network node (information 3-6). In other words, the exchange of information 3-3 and 3-4 would not have been needed.

Having received the user identifier and the password, the network node RNC sends them to the authentication server AutS in information 3-7, which checks, in step 3-8, the user's rights for instance in accordance with the prior art. The example of FIG. 3 assumes that the user has a right to the configuration data. In information 3-9, the authentication server AutS thus sends the user profile identifier in the user rights to the network node RNC.

Having received the user profile identifier, the network node RNC retrieves, in step 3-10, the user profile corresponding to the identifier and including an operator identifier and the rights specified for the user with the accuracy of an object type. In the first preferred embodiment of the invention, the right to an object type means that the sub-objects of an object are within the user rights unless specific user rights have been defined for them, but the objects above the object type in the hierarchy are not included in the scope of the sub-object's user rights. The user profile may also include information about whether the user is allowed to edit the objects or whether the user is only allowed to read them. Having retrieved the user profile the network node RNC filters, in step 3-10, the objects according to the user profile from the network node's configuration. In other words, the RNC comprises a filtering element. The RNC transmits the objects according to the user profile in information 3-11 to the management software EM, which relays them further in information 3-12 to user U. From the configuration in the example of FIG. 2, CoCo 1, WBTS 1, WCEL1, WCEL2, FMC1, FMC2, HOP1 and HOP2 are sent to a user who has the right to receive the entire configuration of operator identifier id1. Similarly, another user of the same operator may have the right to receive objects of the HOP type only. This being the case, he/she would only be sent objects HOP1 and HOP2.

In a preferred embodiment of the invention, the management software does not store the user identifier and the password for the duration of the session, but always asks the user for them.

In a preferred embodiment of the invention, the user profiles in the network node have no operator identifier, but the operator identifier is either in the management software EM or in the authentication server, and the operator identifier is transmitted together with the user profile identifier to the network node.

Figure 4:
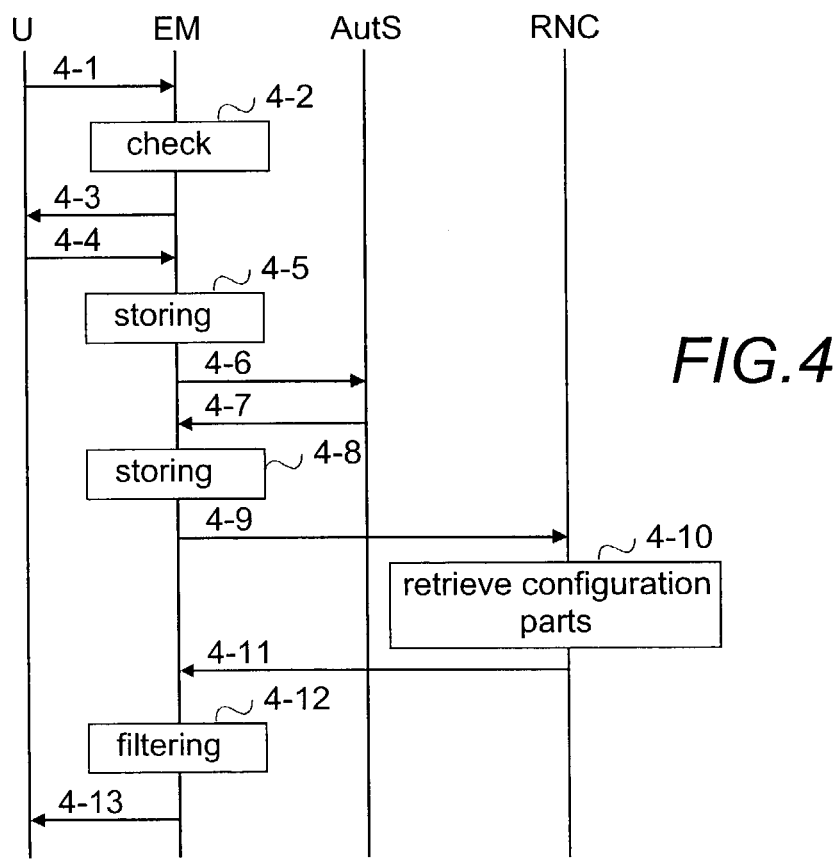
FIG. 4 shows data transfer according to a second preferred embodiment of the invention.

FIG. 4 shows data transfer associated with a network management operation according to a second preferred embodiment of the invention. In the second preferred embodiment of the invention, the user rights are network node-specifically specified in the authentication server for each user. The second preferred embodiment of the invention also assumes that the user only has one operator identifier, which is included in the user rights specified in the authentication server, and that the user is able to communicate with several servers during one session. Furthermore, for the sake of clarity, the example of FIG. 4 also assumes that there is only one base station under the radio network controller.

The starting point in FIG. 4 is that user U transmits, to the management software EM, information 4-1 indicating that the user is interested in the configuration of the radio network controller RNC. The information may include e.g. an edit request, a request to see the configuration or a request for opening a session to said network node.

In step 4-2, the management software EM checks to see if the user has an active session with the management software. The example of FIG. 4 assumes that this is not the case. The management software therefore requests, in information 4-3, a user identifier and a password from user U, which user U returns in information 4-4. In step 4-5, the management software stores the user identifier and the password in its memory for the duration of the session, and transmits, in information 4-6, the user identifier, the password and information on the network node RNC the user is interested in to the authentication server AutS. If there had been a session (step 4-2), the management software would have retrieved the user identifier and the password from its memory to be included in information 4-6.

Having received the user identifier, the password and information on the network node RNC, the authentication server AutS checks, in step 4-7, the user's rights regarding the network node for instance in accordance with the prior art. The example of FIG. 4 assumes that the user has a right to the configuration data. In information 4-7, the authentication server AutS thus sends the user rights to the management software EM for instance as an object type list or an object index list. Information 4-7 also includes the user's operator identifier and any operational rights. Operational rights include for instance 'read only' or 'right to edit'.

In step 4-8, the management software EM stores the user rights temporarily in its memory and transmits the operator identifier to the network node RNC in information 4-9.

Having received the operator identifier, the network node RNC retrieves, in step 4-10, from its configuration data, the common configuration part and all operator-specific configuration parts with which the operator identifier received in information 4-7 is associated, and transmits them in information 4-11 to the management software EM. From the configuration in the example of FIG. 2, information 4-11 includes, for example for operator identifier id1, CoCo 1, WBTS 1, WCEL1, WCEL2, FMC 1, FMC2, HOP1 and HOP2.

Having received the configuration data (information 4-11), the management software EM filters, in step 4-12, the objects according to the user rights from the network node configuration and transmits them, in information 4-13, to user U. All objects received in information 4-11 are transmitted, in information 4-13, for example to a user who has the right to receive the entire configuration of operator identifier id1, but if the user only has the right to receive objects of type HOP, only objects HOP1 and HOP2 are relayed to him/her.

In the second preferred embodiment of the invention, the filtering element is thus divided into two different network nodes: operator-specific parts are filtered off at the RNC and, if need be, in accordance with other user rights, the operator's configuration, composed of the common configuration part and the operator-specific configuration part (or parts), is filtered at the EM.

In a preferred embodiment of the invention, the management software EM also relays user rights in information 4-9 to the network node, which then filters the configuration data and returns, in information 4-11, information according to the user rights (i.e. the management software EM filters nothing in this embodiment and the filtering element is located at the network node).

In a preferred embodiment of the invention, the management software EM does not relay the operator identifier in information 4-9 to the network node RNC, but the network node RNC transmits all its configuration data to the management software EM, which then filters the configuration based on the operator identifier and the user rights.

Although the invention was described above under the assumption that the user only sees that part of the configuration to which he/she has management, or user rights, it is apparent to a person skilled in the art how the invention is applied in embodiments where the user sees the entire configuration (including all operator-specific configuration parts in an embodiment), and where the user rights are used to check the right of a user to edit that particular item in the configuration only when the configuration is being edited.

Although the invention was described above under the assumption that only one operator identifier is associated with one operator-specific configuration part and its object, it is apparent to a person skilled in the art that the invention can also be implemented when the operator-specific configuration part or part thereof is common to some of the operators sharing the network node. If part of the operator-specific configuration part is common to some of the operators, the configuration is in a way divided into three parts: a part common to all, a part common to given operators and operator-specific parts.

Although the invention was described above under the assumption that an operator-specific configuration is specified for each operator sharing a network node, it is apparent to a person skilled in the art that the invention can also be applied in solutions, in which an operator-specific configuration specifying extra properties is specified only for some operators (even only one) sharing a network node. In these solutions, the common part includes the objects that have to be specified in order for data to be transferred, and the operator-specific configuration only includes some additional properties.

Although the invention was described above in connection with the configuration of a radio network controller, it is apparent to a person skilled in the art that a similar division of the configuration can also be performed on other shared network nodes, such as a base station, an ATM router or other accessories, a location management unit (LMU), and an antenna tilt controller.

The telecommunication system and network nodes implementing the functionality of the present invention comprise, not only state-of-the-art means required for managing the configuration, but also means for generating and managing the configuration by the use of configuration parts in the manner described above. Present network nodes comprise processors and memory, which can be utilized in the functions according to the invention. All modifications required for implementing the invention can be performed as routines, which may be implemented as added or updated software routines, application circuits (ASIC) and/or programmable circuits, such as EPLD (Electrically Programmable Logic Device), FPGA (Field Programmable Gate Array).

It is obvious to a person skilled in the art that as technology advances, the basic idea of the invention can be implemented in a variety of ways. The invention and its embodiments are thus not limited to the above examples, but may vary within the claims.

The invention claimed is:

1. A method of managing the configuration of a network node shared by at least a first network operator and a second network operator, the method comprising at least the following:

maintaining, for the network node, at least one common configuration part, a managing right of which is available to users belonging to personnel of any of network operators sharing the network node, the managing right of a user depending on user rights of the user, and at least a first operator-specific configuration part for the first network operator, a managing right of which is restricted to only users belonging to personnel of the first network operators sharing the network node, the managing right of a user depending on user rights of the user, and at least a second operator-specific configuration part for the second network operator, a managing right of which is restricted to only users belonging to personnel of the second network operator sharing the network node, the managing right of a user depending on user rights of the user;

generating first operator's configuration, which the users belonging to personnel of the first network operator are able to manage according to their user rights, the first operator's configuration comprising the common part and the first operator-specific part; and generating a second operator's configuration, which the users belonging to personnel of the second network operator are able to manage according to their user rights, the second operator's configuration comprising the common part and the second operator-specific part.

2. The method as claimed in claim 1 wherein the managing right of the operator-specific configuration part is restricted to only one network operator.

3. The method as claimed in claim 1 wherein the managing right is assigned by associating the operator-specific configuration part with an operator identifier.

4. The method as claimed in claim 3, further comprising:
specifying user rights for each user of configuration data, the rights including an operator identifier;
filtering a configuration visible to a user from the operator's configuration by utilizing the user rights.

5. A telecommunication system, comprising:
one network node shared at least by a first network operator and a second network operator, wherein
a configuration of the network node comprises at least one common configuration part, a managing right of which is available to users belonging to personnel of any of the at least first and second network operator sharing the network node, the managing right of a user depending on user rights of the user, and at least a first operator-specific configuration part for the first network operator, to which only users belonging to personnel of the first network operators sharing the network node have managing rights, the managing right of a user depending on user rights of the user, and at least a second operator-specific configuration part for the second network operator, a managing right of which is restricted to only users belonging to personnel of the second network operator sharing the network node, the managing right of a user depending on user rights of the user, whereby the telecommunication system is configured to generate first operator's configuration, which the users belonging to personnel of the first network operator are able to manage according to their user rights, the first operator's configuration comprising the common part and the first operator-specific part, and a second operator's configuration, which the users belonging to personnel of the second network operator are able to manage according to their user rights, the second operator's configuration comprising the common part and the second operator-specific part.

6. The telecommunication system as claimed in claim 5, the system also comprising at least one filtering element for filtering from the network node's configuration those network node configuration parts, to which the network operator requesting configuration has a managing right.

7. The telecommunication system as claimed in claim 5, the system also comprising an authentication server for authenticating a user of the network node configuration and for direct or indirect indication of user rights that indicate the operator-specific configuration parts the user is allowed to manage.

8. The telecommunication system as claimed in claim 7, the system also comprising at least one filtering element for filtering the network node configuration parts from the network node's configuration, to which the user has user rights.

9. The telecommunication system as claimed in claim 7, wherein the network node is configured to associate each operator-specific configuration part with an operator identifier and to maintain user profiles, which include user rights to the network node configuration and the operator identifier, and wherein the authentication server is configured to indicate the user rights to the network node by indicating the user profile to be used.

10. A network node in a telecommunication system, the node being shared by at least a first network operator and a second network operator in the telecommunication system, and a configuration of the network node comprising at least one common configuration part, a managing right of which is available to users belonging to personnel of any of the at least the first and second network operators sharing the network node, and at least a first operator-specific configuration part, whose management right is available to users belonging to personnel of the first network operators sharing the network node, the managing rights of a user also depending on user rights of the user and at least a second operator-specific configuration part, whose management right is available to users belonging to personnel of the second network operators sharing the network node, the managing rights of a user also depending on user rights of the user.

11. The network node in a telecommunication system as claimed in claim 10, the network node comprising means for receiving a request concerning configuration data and means for transmitting, in response to the request, the configuration that comprises the common part and all the operator-specific configuration parts, to which the network operator that sent the request has management rights.

12. The network node in a telecommunication system as claimed in claim 10, wherein
   at least one operator identifier is associated with operator-specific configuration parts and it is used to indicate who has management rights to the operator-specific configuration part, and
   the network node also comprises user profiles comprising an operator identifier and other rights of use, and the network node comprises a filtering element for filtering parts from the configuration according to the user profile.

13. The network node in a telecommunication system as claimed in claim 10, wherein the network node is in a radio network providing radio access for a terminal in the telecommunication system.

14. A telecommunication system, comprising:
   at least one network element providing means to at least a first network operator and a second network operator to provide services to network operators' subscribers, the network element comprising a configuration, the configuration comprising a common part for at least the first network operator and the second network operator and at least a first operator-specific part for the first network operator and a second operator-specific part for the second network operator,
   a first operator network means and a second operator network means for communicating on said network element;
   configuration means for setting the configuration of said network element, the configuration means shared at least by the first network operator and the second network operator,
   wherein the configuration means comprises at least one common configuration means for setting the common configuration part, the common configuration means being responsive to at least the first operator network means and to the second operator network means and at least first operator-specific configuration means for setting configurations of the first operator-specific configuration part, the first operator-specific configuration means being responsive only to the first operator network means and at least second operator-specific configuration means for setting configurations of the second operator-specific configuration part, the second operator-specific configuration means being responsive only to the second operator network means.

15. The telecommunication system as claimed in claim 14, said system further comprising at least one filtering means for filtering, in response to a request received from one of the first network element means and the second network element means, from the configuration of said network element, those configuration parts whose configuration means are responsive to the network element means from which the request was received.

16. The telecommunication system as claimed in claim 14, said system also comprising authentication means for authenticating a user of network element means and for direct or indirect indication of user rights that indicate the common configuration part and the operator-specific configuration part, if any, accessible to the user via the network element means.

17. The telecommunication system as claimed in claim 16, said system also comprising at least one filtering means for filtering from the configuration of the network element those configuration parts which are accessible to the user.

18. The telecommunication system as claimed in claim 16, comprising also means for associating each operator-specific configuration part with an operator identifier, and for maintaining user profiles, said user profiles including operator identifier and users access rights to different configuration parts, wherein the authentication means is configured to indicate the accessible configuration parts by indicating the user profile to be used.

19. A method of managing the configuration of a network node shared by at least two network operators, the method comprising:
   maintaining, for the network node, a configuration that is divided into at least two different configuration parts, said configuration parts comprising at least one common configuration part, a managing right of which is available to users belonging to personnel of any of the network operators sharing the network node, the managing right of a user depending on user rights of the user, and at least one operator-specific configuration part, a managing right of which is restricted to only some of the network operators sharing the network node;
   generating, for the network node, at least two different operators' configurations, so that the users belonging to personnel of a network operator are able to manage an operator's configuration of their network operator according to their user rights, the operator's configuration comprising the common part and only the operator-specific parts to which the network operator has the managing right; and
   using said different operators' configurations to provide separate cells to subscribers of said at least two network operators, so that a cell is provided to a subscriber by means of an operator's configuration of the subscriber's network operator.

20. A telecommunication system, comprising:
   one network node shared at least by two network operators, wherein
   a configuration of the network node is divided into at least two different configuration parts, said configuration parts comprising at least one common configuration part, a managing right of which is available to users belonging to personnel of any of the at least two network operators sharing the network node, the managing right of a user depending on user rights of the user, and at least one operator-specific configuration part, to which only some of the network operators that are sharing the network node have managing rights, whereby the telecommunication system is configured to generate for the network node at least two different operators' configurations, so that the users belonging to personnel of a network operator are able to manage an operator's configuration of their network operator according to their user rights, the operator's configuration of their network operator according to their user rights, the operator's configuration comprising the common part and only the operator-specific parts to which the network operator has the managing right; and
   to use said different operators' configurations to provide separate cells to subscribers of said at least two network operators, so that a cell is provided to a subscriber by means of an operator's configuration of the subscriber's network operator.

21. A network node in a telecommunication system, the node being shared by at least two network operators in the telecommunication system, and a configuration of the network node is divided into at least two different configuration parts, said configuration parts comprising at least one common configuration part, a managing right of which is available to users belonging to personnel of any of the at least two network operators sharing the network node, and at least one operator-specific configuration part, whose management right is available to users belonging to personnel of only some of the network operators sharing the network node, the managing rights of a user also depending on user rights of the user, whereby the network node is configured to generate at least two different operators' configurations for the network node, so that users belonging to personnel of a network operator are able to manage an operator's configuration of their network operator according to their user rights, the operator's configuration comprising the common part and only the operator-specific parts to which the network operator has the managing right; and to use said different operators' configuration to provide separate cells to subscribers of said at least two network operators, so that a cell is provided to a subscriber by means of an operator's configuration of the subscriber's network operator.

22. A network node in a telecommunication system, the node being shared by at least a first network operator and a second network operator in the telecommunication system, and a configuration of the network node comprises at least one common configuration part, a managing right of which is available to users belonging to personnel of any of the at least the first and second network operators sharing the network node, and at least a first operator-specific configuration part, whose management right is available to users belonging to personnel of the first network operators sharing the network node, the managing rights of a user also depending on user rights of the user and at least a second operator-specific configuration part, whose management right is available to users belonging to personnel of the second network operators sharing the network node, the managing rights of a user also depending on user rights of the user; wherein the network node comprises means for receiving a request concerning configuration data and means for transmitting, in response to the request, an operator's configuration, said means being configured, in response to a request from the first network operator, to transmit a first network operator's configuration comprising the common part and the first operator-specific configuration part, and in response to a request from the second network operator, to transmit a second network operator's configuration comprising the common part and the second operator-specific configuration part.

* * * * *

UNITED STATES PATENT AND TRADEMARK OFFICE
CERTIFICATE OF CORRECTION

PATENT NO.        : 7,065,346 B2              Page 1 of 1
APPLICATION NO.   : 10/372238
DATED             : June 20, 2006
INVENTOR(S)       : Kinnunen It is certified that error appears in the above-identified patent and that said Letters Patent is hereby corrected as shown below:

On the Title Page item (30),

Please insert Foreign Application Priority Data as follows:

-- Feb. 26, 2002    (FI)………………...20020367 --

Signed and Sealed this

Fourteenth Day of November, 2006

JON W. DUDAS
*Director of the United States Patent and Trademark Office*